US012617345B2

(12) United States Patent　　　　(10) Patent No.: US 12,617,345 B2
Kellner et al.　　　　　　　　　　　(45) Date of Patent: May 5, 2026

(54) MOTOR VEHICLE WITH A CARGO SPACE AND A CARGO SPACE WELL BOUNDING THE CARGO SPACE

(71) Applicant: Dr. Ing. h.c. F. Porsche Aktiengesellschaft, Stuttgart (DE)

(72) Inventors: Philipp Kellner, Renningen-Malmsheim (DE); Scally Rommelfanger, Bad Liebenzell (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 379 days.

(21) Appl. No.: 18/214,681

(22) Filed: Jun. 27, 2023

(65) Prior Publication Data

US 2024/0051466 A1　　Feb. 15, 2024

(30) Foreign Application Priority Data

Aug. 11, 2022　(DE) ..................... 10 2022 120 274.7

(51) Int. Cl.
B60R 5/02　　　　　(2006.01)
(52) U.S. Cl.
CPC ..................................... B60R 5/02 (2013.01)
(58) Field of Classification Search
CPC ..................................................... B60R 5/02
See application file for complete search history.

(56) References Cited

FOREIGN PATENT DOCUMENTS

| DE | 102016102253 | A1 | * | 8/2017 | ............ B62D 25/04 |
| DE | 102017120533 | A1 | * | 3/2019 | ......... H01M 50/227 |
| DE | 102021112765 | A1 | | 11/2022 | |
| KR | 102212230 | B1 | * | 2/2021 | ............ B29C 70/42 |

OTHER PUBLICATIONS

Handing et al., German Patent No. DE102016102253-A1. 2019. English translation date 2025. (Year: 2019).*
Kellner, German Patent No. DE 102016102253 A1. 2017. English translation date 2025. (Year: 2017).*
Goo et al., Korean Patent No. KR 102212230 B1, 2021. English translation date 2025. (Year: 2001).*

\* cited by examiner

*Primary Examiner* — Caroline N Butcher
(74) *Attorney, Agent, or Firm* — Buchanan Ingersoll & Rooney PC

(57)　　　　ABSTRACT

A motor vehicle having a cargo space and a cargo space well bounding the cargo space, wherein the cargo space well includes at least two tray parts and a frame structure connected to the tray parts. The respective tray part includes a floor section and at least one side wall section extending from the floor section, wherein the tray parts are arranged in such a way that the floor sections overlap in the region of their main expansion surfaces. The side wall sections of the tray parts circumferentially bound the cargo space, wherein adjacent side wall sections of the tray parts are connected to one another.

20 Claims, 5 Drawing Sheets

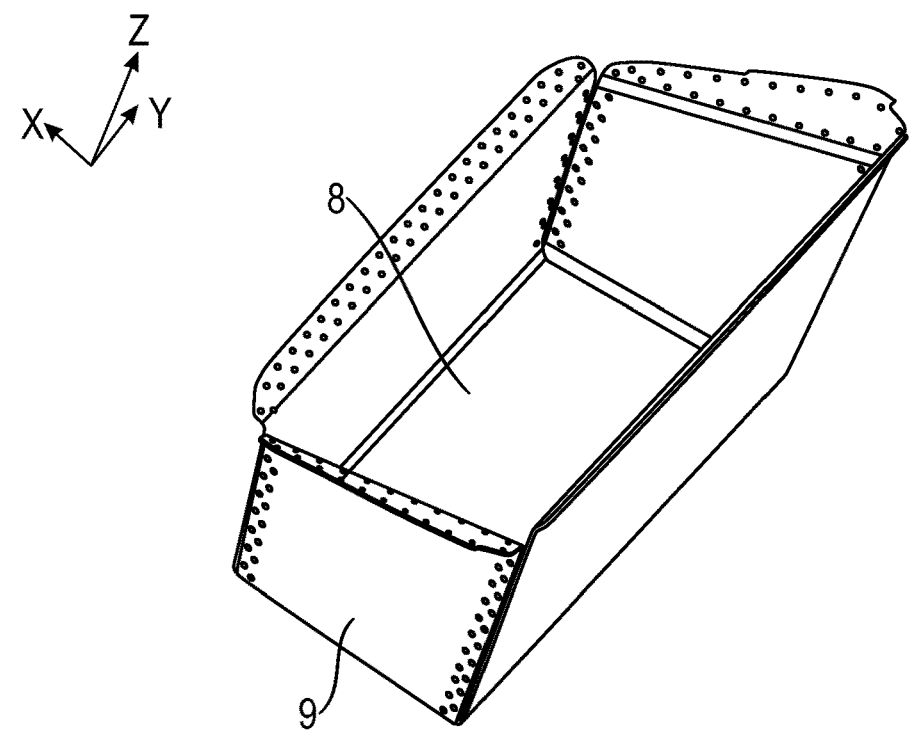
Fig. 7
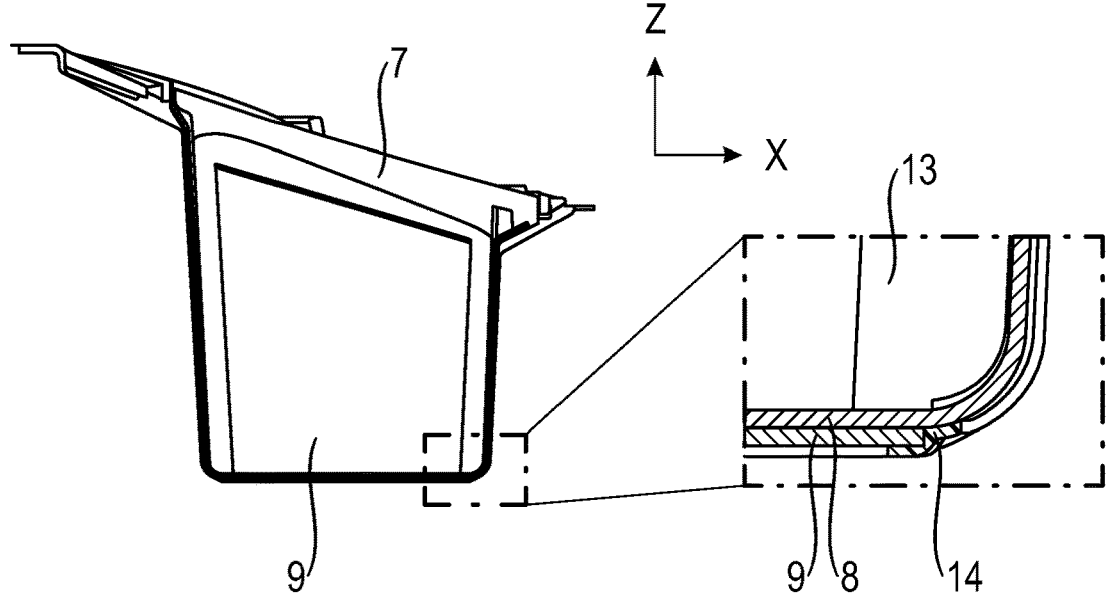
Fig. 8
Fig. 9

MOTOR VEHICLE WITH A CARGO SPACE AND A CARGO SPACE WELL BOUNDING THE CARGO SPACE

CROSS-REFERENCE TO RELATED APPLICATION

This application claims priority to German Patent Application No. 10 2022 120 274.7, filed Aug. 11, 2022, the content of such application being incorporated by reference herein in its entirety.

FIELD OF THE INVENTION

The present invention relates to a motor vehicle having a cargo space and a cargo space well bounding the cargo space, in particular a motor vehicle having a cargo space configured in a front end of the motor vehicle. Further, the invention relates to a method for manufacturing a cargo space well.

BACKGROUND OF THE INVENTION

Motor vehicles typically have a cargo space, often also referred to as trunk or luggage compartment, with a cargo space cavity, also referred to as a trunk cavity or luggage cavity. A cargo space can be configured in the front end, thus the front area of the vehicle, as well as in the rear end of the vehicle, thus the rear area. For example, if the motor vehicle comprises a center-engine or a rear-engine, the cargo space is typically configured in the front end. Even in electrically operated motor vehicles, due to the arrangement of the at least one electric motor used for propulsion in the front of the motor vehicle, there is typically room for a cargo space. The cargo space is bounded by a cargo space well, which is closed by a cargo space lid. With the cargo space lid open, the cargo space is accessible from above. The cargo space bounded by the cargo space well is often also referred to as the trunk cavity. Cargo space trays in the front end are often made of short or long fiber-reinforced thermoplastics. Injection molding or pressing processes are often used.

In order to meet the required stiffness under stress and to reduce the maximum deflection of the cargo space well floor under weight loading, a reinforcing structure, for example in the form of ribs, is often provided in the region of the tray floor and/or the material strength is increased in this region compared to the material strength in the region of side walls of the tray. For example, a cargo space well having a reinforcing structure formed in the region of the well floor is known from KR 102212230 B1, which is incorporated by reference herein.

SUMMARY OF THE INVENTION

Described herein is a motor vehicle with a cargo space well designed in such a way that the cargo space well has a high stability with low weight and low manufacturing effort. More particularly, the motor vehicle according to the present invention comprises a cargo space and a cargo space well bounding the cargo space, wherein the cargo space well comprises at least two tray parts and a frame structure connected to the tray parts, wherein the respective tray part comprises a floor section and at least one side wall section extending from the floor section, wherein the tray parts are arranged in such a way that the floor sections overlap in the region of their main expansion surfaces, and the side wall sections of the tray parts circumferentially bound the cargo space, wherein adjacent side wall sections of the tray parts are connected to one another. The tray parts are arranged in a rotated manner with respect to their side wall sections, such that the side wall sections are adjacent in a circumferential direction of the cargo space well and at most slightly overlap, such that the strength of the side wall of the cargo space well is substantially identical to the strength of the side wall sections, whereas, by the overlapping arrangement of the floor sections, a wall strength in the floor region corresponds to the sum of the strength of the floor sections, whereby a reinforcement in the floor region is achieved. In comparison to the side walls and side wall sections, the floor region is generally exposed to a higher load, because it is stressed on flexure, while the sidewall sections are stressed primarily in tension. With the design according to aspects of the invention, a reinforcement in the floor region is easily achieved by the overlapping of the tray parts, while the strength in the circumferential region is not increased, because the side wall sections of the tray parts are circumferentially abut one another and preferably do not overlap. The frame structure achieves an additional stiffening of the cargo space well.

The adjacent side wall sections need not contact one another, for example impact one another. It is quite conceivable and preferable that a gap between two adjacent side wall sections is filled by a section of the frame structure.

Preferably, the cargo space well comprises exactly two tray parts.

Preferably, the respective side wall section of the one tray part of the two tray parts is arranged between two respective side wall sections of the other tray part of the two tray parts, and vice versa, the respective side wall section of the other tray part of the two tray parts is arranged between two respective side wall sections of the one tray part of the two tray parts.

Preferably, the tray parts are U-shaped and/or L-shaped. It is quite conceivable that one or more tray parts are U-shaped and another or a several other tray parts are L-shaped.

Preferably, the respective tray part comprises precisely two side wall sections which are opposite one another.

Preferably, the respective tray part is U-shaped. In particular, the two tray parts are arranged rotated about 90° with respect to one another in terms of their side wall sections.

It is considered particularly advantageous when the cargo space is circumferentially bounded by exactly four side wall sections.

The cargo space is preferably cuboid.

Preferably, the tray parts are made of a wooden material or comprise a wooden material. In the present case, wooden materials are understood to mean materials that are produced by shredding wood and then assembling the structural elements. For example, the wooden material can be a plywood or a veneer. Various types of real wood can be used in the wood of the wooden material, inter alia beech, oak, birch, pine, spruce, fir, and balsa wood. However, bamboo or coconut wood are also conceivable.

For tray parts made of veneer wood, a number of veneer layers of the tray parts are preferably the same. However, it is also conceivable that the number of veneer layers of the tray parts is different. The stiffness of the side walls can thereby be carried out differently. Stronger side wall sections can then be formed by a tray part having a higher number of layers.

Preferably, the tray parts respectively comprise at least one layer of a wood material. In particular, the tray parts comprise at least one veneer layer glued to a beam or to further veneer layers. Due to the number and thickness of the veneer layers and the properties of the adhesive layers, the bending stiffness can be adjusted very precisely and well.

It is considered advantageous when the respective tray part is an integrally formed molded wooden part. For example, the molded wooden part can be pressed. The molded wooden part can be configured as a solid wooden part, for example. Preferably, however, the molded wooden part is a multi-ply molded part, for example a molded plywood part.

Regions of the tray parts that are exposed to environmental influences can comprise a coating.

Preferably, the tray parts are connected to one another in the region of the overlapping floor sections, for example bonded, in particular glued.

It is quite conceivable that a further layer of material is arranged between the floor sections, for example a wood layer, a foam, a film, an adhesive foil, and/or an adhesive layer.

Against the background of simple manufacturing, it is considered advantageous when a material strength of the respective tray part in the region of the floor section and a material strength of the respective tray part in the region of the side wall sections are the same or substantially the same.

Preferably, the frame structure is made of plastic or fiber-reinforced plastic.

Preferably, the frame structure forms an upper, circumferential edge of the cargo space well. This achieves a particularly high stability and stiffening in the upper region of the cargo space well. Also, a type of edge protection is achieved in order to protect the upper edge from damage during loading and unloading of the cargo space well.

The frame structure is preferably formed on an exterior of the tray parts.

It is considered advantageous when the frame structure comprises side struts extending along adjacent outer edges of the side wall sections and/or comprises floor struts extending along outer edges of the overlapping floor sections and/or end struts extending along the ends of the side wall sections facing away from the floor section.

It is considered particularly advantageous with regard to additional stabilization of the floor of the cargo space well when the bottom-most tray part rests on the floor struts. Preferably, at least one of the floor struts of the frame structure has a stepped cross-section for the positively locking accommodation of the bottom-most tray part.

Preferably, the frame structure is sprayed onto the tray parts. This creates a particularly structurally stable composite and closes any gaps between adjacent outer edges of the side wall sections.

An inner side of the cargo space well can be partially or entirely lined with a carpet.

Preferably, the cargo space well forms an assembly part, which can be handled as a unit and is fastened to a body structure of the vehicle, for example screwed to the body structure by means of screws. However, it is also conceivable that the cargo space well can be glued to the body structure.

When assembling the cargo space well, it is quite conceivable that the cargo space well can be assembled after painting the body structure. It is also conceivable, however, that the cargo space well has been connected to the body structure prior to painting the body structure.

Preferably, the cargo space well is located in a front end of the vehicle.

It is considered advantageous when the cargo space well is fastened to a vehicle structure, for example the body, and is not removable from the vehicle in that respect. However, it is also generally conceivable that the cargo space well tray can be removed from the motor vehicle, for example in order to function as a carry box.

The method according to aspects of the invention serves the manufacture of a cargo space well, wherein the method comprises at least the following method steps:

provide at least two tray parts, wherein the respective tray part comprises a floor section and at least one side wall section extending from the floor section, inserting the tray parts into an injection molding tool such that the floor sections are arranged so as to overlap in the region of their main expansion surfaces, and the side wall sections of the tray parts circumferentially bound a cargo space of the cargo space well, spraying a frame structure by means of the injection molding tool such that the sprayed frame structure is connected to the tray parts in a positively locking and/or materially locking manner.

Preferably, the tray parts are connected to one another before the tray parts are inserted into the injection mold, for example by gluing or screwing. This facilitates the handling and positioning of tray parts in the injection molding tool. Preferably, such a connection takes place in the region of the floor sections.

BRIEF DESCRIPTION OF THE DRAWINGS

In the following figures, the invention is explained in further detail with reference to embodiment examples, without being limited thereto. The figures show:

FIG. 7 depicts the first and the second tray parts in an overlapping arrangement in a perspective view, FIG. 8 depicts the cargo space well according to FIG. 3 in a first sectional view in a line of sight in the vehicle transverse direction, FIG. 9 depicts a sub-region of FIG. 8 in an enlarged illustration.

DETAILED DESCRIPTION OF THE INVENTION

Figure 1:
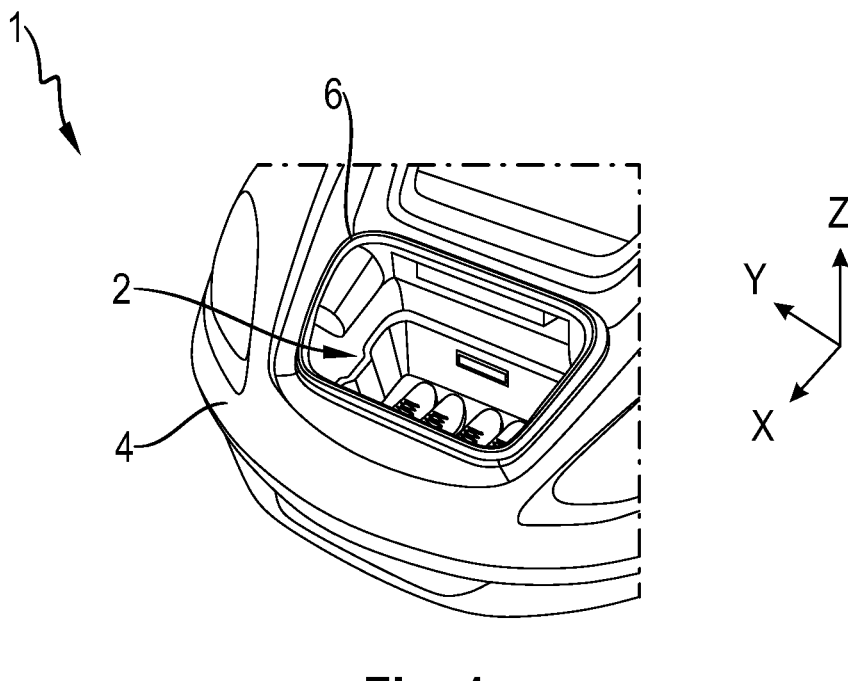
FIG. 1 depicts a front end of a motor vehicle with a cargo space well arranged in the front end in a perspective view.
Figure 2:
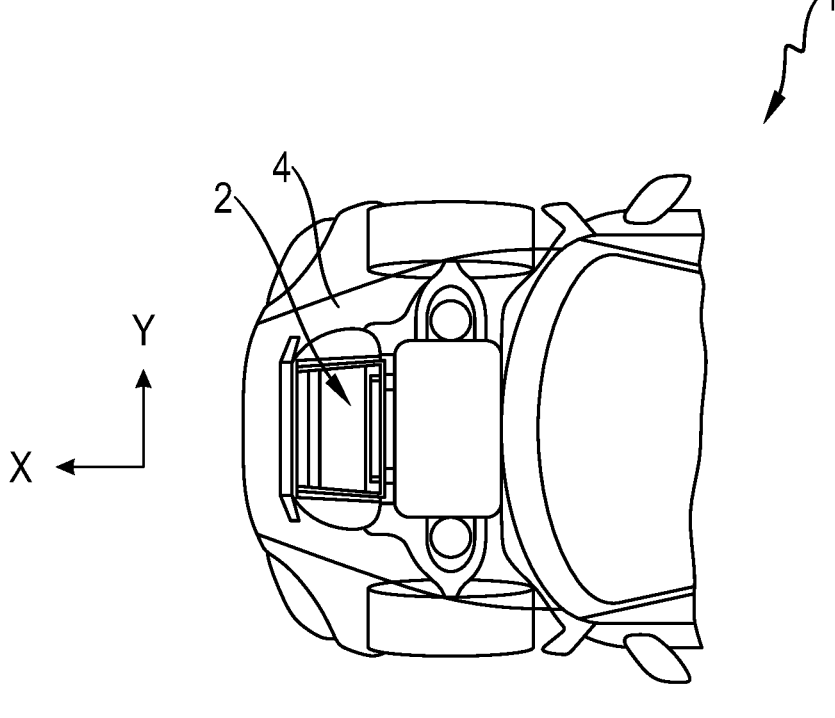
FIG. 2 depicts the front end according to FIG. 1 in a top view.
Figure 3:
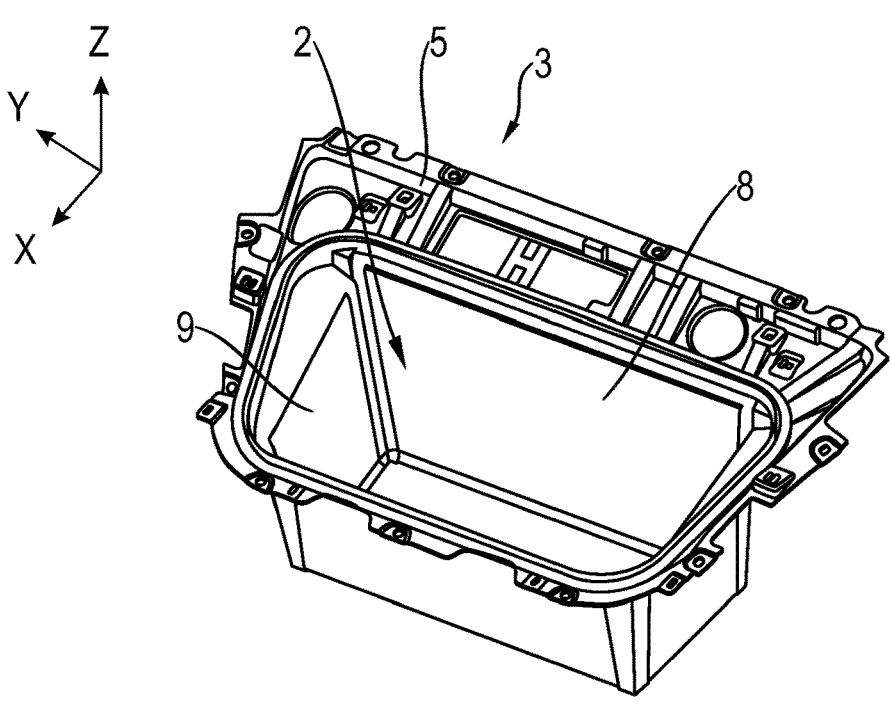
FIG. 3 depicts an isolated illustration of an embodiment of the cargo space well in a perspective view.

FIGS. 1 and 2 show a front end 1 of a motor vehicle, wherein a cargo space 2 is configured in the region of the front end 1. This cargo space 2 is bounded by a cargo space well 3 so that the cargo space 2 is formed in the manner of a cargo space cavity. The cargo space well 3 is configured as an assembly part, wherein this assembly part is connected to a body structure 4 of the motor vehicle. For this purpose, as can be seen in FIG. 3, the cargo space well 3 comprises a circumferential, outwardly projecting fastening section 5 at its upper end, wherein this fastening section 5 projects outwardly. This fastening section 5 comprises several through-openings for fastening means, in the present case for screws, wherein the fastening section 5 is directly screwed to the body structure 4 of the motor vehicle via these through-openings.

As can be seen in particular in FIG. 1, a panel element 6 is arranged adjacent to the cargo space well 3, which covers the fastening section 5 such that it is not visible when the cargo space flap is opened.

Figure 4:
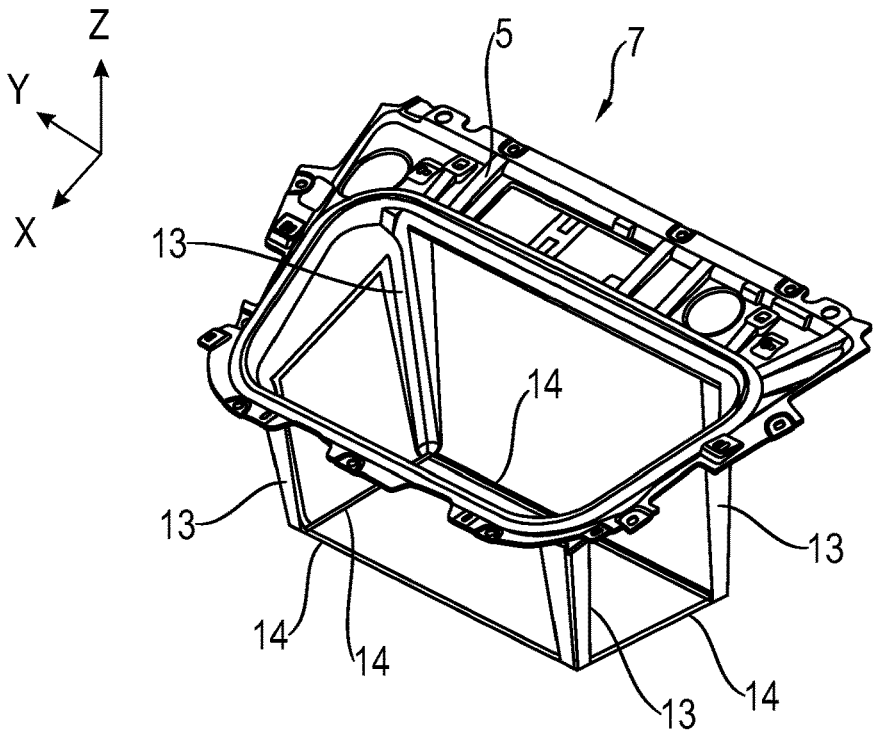
FIG. 4 depicts a frame structure of the cargo space well according to FIG. 3 in a perspective view.

The cargo space well 3 forms an assembly part that can be handled as a unit, wherein the cargo space well 3 comprises a frame structure 7 manufactured of plastic by means of injection molding and precisely two tray parts 8, 9 supported in the frame structure 7 made of a wood material, wherein the frame structure 7 is directly sprayed onto the tray parts 8, 9 and thereby connected thereto. In this respect, the cargo space well 3 is a component in a wood-plastic hybrid design. The three components of the cargo space well 2 are shown in isolation in FIGS. 4, 5, 6, respectively.

The two tray parts 8, 9 are respectively configured as molded wooden parts bent in a U-shape. The respective molded wooden part consists of several veneer layers, which are glued together. The respective tray part 8, 9 comprises a floor section 10 and side wall sections 11 extending from the floor section 10, wherein the side wall sections 11 are formed at an angle to the floor section 10.

As can be seen in particular in FIG. 7, the two tray parts 8, 9 are arranged rotated about 90° with respect to one another, such that the floor sections 10 of the tray parts 8, 9 overlap in the region of their main expansion surfaces and the side wall sections 11 of the tray parts 8, 9 abut one another, such that the side wall sections 11 circumferentially bound the cargo space 2. The one tray part 8 is arranged such that the side wall sections 11 of this tray part 8 form the rear wall and the front wall of the cargo space well 3. By contrast, the other tray part 9 is arranged such that the side wall sections 11 of this tray part 9 form the right and left side wall of the cargo space well 3.

The respective tray parts 8, 9 have an outwardly-bent connection section 12 in the region of the respective floor section 10 facing away from the ends of the side wall sections 11, wherein the frame structure 7 is sprayed over the entire surface on the connection sections 12.

The frame structure 7 comprises, as already stated, a circumferential fastening section 5, wherein several side struts 13 extend downwardly from this fastening section 5 in the vehicle vertical direction Z. In the lower region of the frame structure 7, the side struts 13 are connected to one another by several floor struts 14. These floor struts 14 run below the tray part 9 so that the tray parts 9 support themselves in the vehicle vertical direction Z on the floor struts 14.

As can be seen in particular in FIG. 9, one of the floor struts 14 extending in the vehicle transverse direction Y has a stepped cross-section, wherein the floor section 10 of the tray part 9 is received in the stepped cross-section in a positively locked manner.

Figure 5:
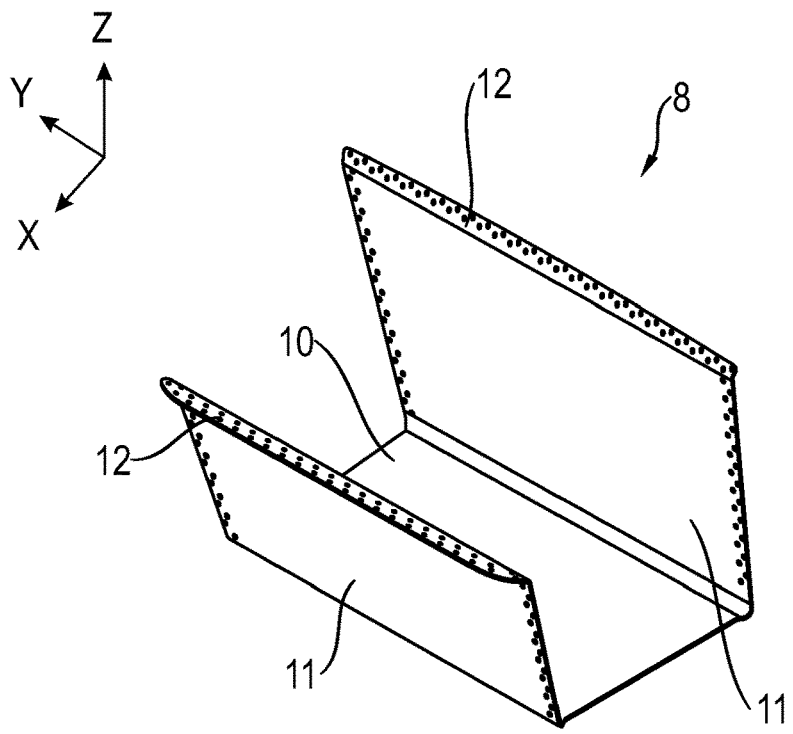
FIG. 5 depicts a first well part of the cargo space well according to FIG. 3 in a perspective view.
Figure 6:
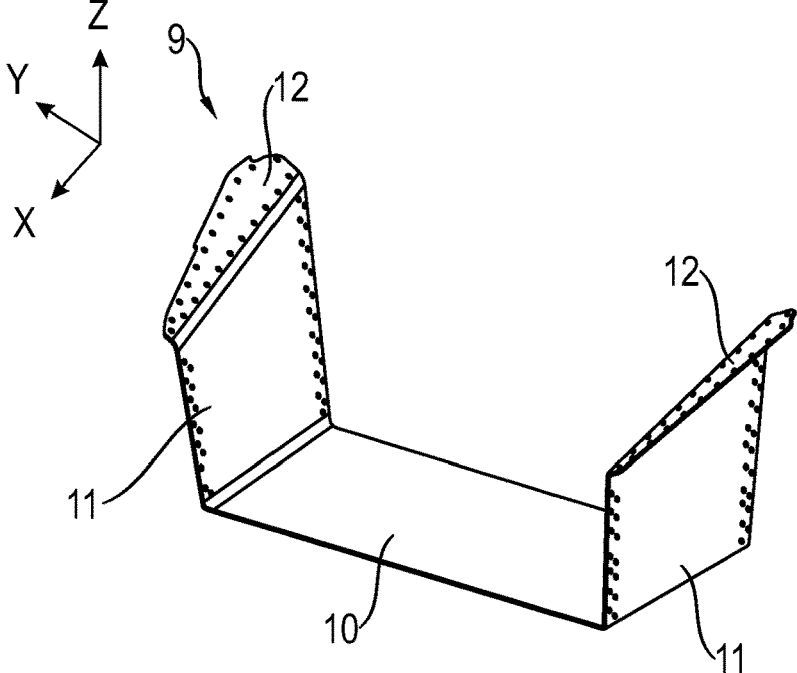
FIG. 6 depicts a second tray part of the cargo space well according to FIG. 3 in a perspective view.
Figures 10, 11:
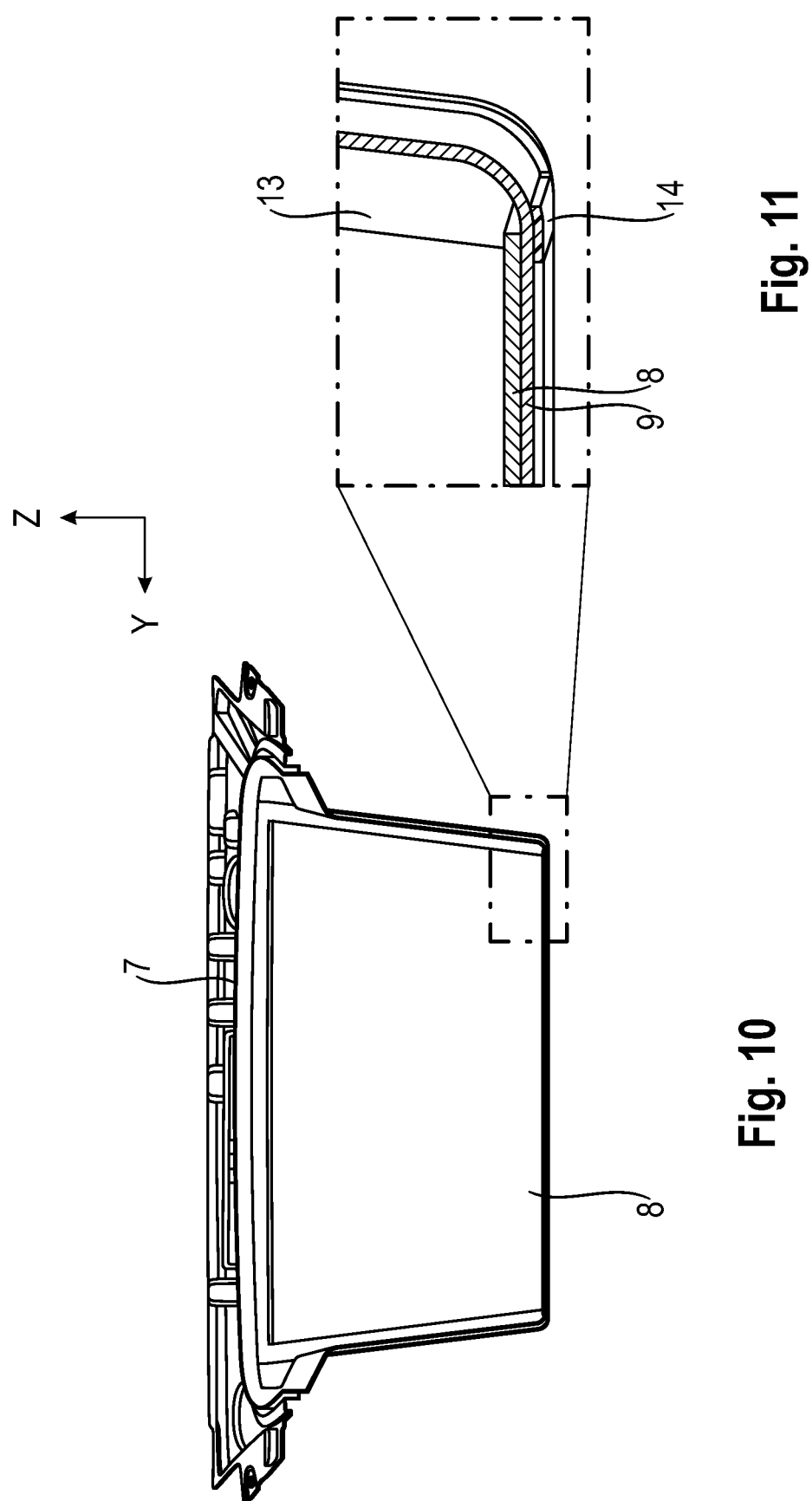
FIG. 10 depicts the cargo space well according to FIG. 3 in a second sectional view in a line of sight in the vehicle longitudinal direction.
FIG. 11 depicts a sub-region of FIG. 10 in an enlarged illustration.

As can be seen in particular in FIGS. 5 and 6, the two tray parts 8, 9 are molded parts curved in a U-shape, whose surface can be unwrapped into a plane. Such bent molded parts are particularly easy to manufacture, because the surface does not have a multiple curvature.

The overlapping arrangement of the tray parts 8, 9 being rotated in relation to one another has the advantage that the floor of the cargo space well 3 has a greater material strength, namely doubled, due to the overlapping arrangement of the floor sections 10 of the tray parts 8, 9, whereas the side walls of the cargo space well 3 are not reinforced in their thickness despite the overlapping arrangement, because the side wall sections 11 do not overlap with one another, but merely abut one another in the circumferential direction. This leads to a strength increase and weight savings by reduction of overlapping regions between the individual components. In addition, the proportion of plastic can be reduced, because the tray parts 8, 9 have good strength and dimensional stability due to their integral design and a separate fastening of separate side walls to a separate floor can also be omitted.

In particular, when using a wooden material to produce the tray parts 8, 9, a majority of the cargo space well 3 can be produced from renewable raw materials. This resulted in a reduction of the $CO_2$ footprint in the manufacture of the cargo space well 3. Due to the use of integral tray parts 8, 9, the cost of assembly in the manufacture of the cargo space well 3 is also reduced, for example, because the separate assembly of side walls is omitted, as this would be necessary if plate-shaped components were used. In the present example, instead of the two bent tray parts 8, 9, five individual plates, namely a floor plate and five side plates, would then have to be assembled. In addition, the frame structure 7 would have to be designed more strongly, because the connection region of the respective plate to the remaining plates would have to be strengthened, because in these regions the stability would have to be provided by the frame structure 7.

LIST OF REFERENCE NUMBERS

1 Front end
2 Cargo space
3 Cargo space well
4 Body structure
5 Fastening section
6 Panel element
7 Frame structure
8 Tray part
9 Tray part
10 Floor section
11 Side wall section
12 Connection section
13 Side strut
14 Floor strut

What is claimed is:

1. A motor vehicle comprising:

a cargo space well bounding a cargo space, wherein the cargo space well comprises at least two tray parts and a monolithic frame structure connected to the tray parts, wherein each tray part is a unitary body comprising a floor section and two side wall sections extending vertically from opposite sides of the floor section to form a U-shaped structure, wherein the tray parts are arranged in such a way that the floor sections overlap, and the side wall sections of the tray parts circumferentially bound the cargo space, wherein adjacent side wall sections of the tray parts are connected to one another, and wherein the monolithic frame structure comprises (i) floor struts engaging with at least one of the floor sections and (ii) side struts for supporting the side wall sections.

2. The motor vehicle according to claim 1, wherein the tray parts are composed of a wood material or comprise a wood material.

3. The motor vehicle according to claim 1, wherein the tray parts are connected to one another in a region of the overlapping floor sections.

4. The motor vehicle according to claim 1, wherein, for each tray part, a material strength of the respective tray part in a region of the floor section and a material strength of the respective tray part in a region of the side wall sections are the same.

5. The motor vehicle according to claim 1, wherein the frame structure is made of plastic or fiber-reinforced plastic.

6. The motor vehicle according to claim 1, wherein the frame structure forms an upper circumferential edge of the cargo space well.

7. The motor vehicle according to claim 1, wherein the side struts extend along adjacent outer edges of the side wall sections and/or the floor struts extend along outer edges of the overlapping floor sections.

8. The motor vehicle according to claim 1, wherein the frame structure is sprayed or injected onto the tray parts.

9. The motor vehicle according to claim 1, further comprising a horizontally extending fastening section that is configured to be connected to a body of the motor vehicle, wherein the fastening section is formed integrally with the monolithic frame structure.

10. The motor vehicle according to claim 9, wherein the fastening section includes openings for receiving fasteners that are fastened to the body.

11. The motor vehicle according to claim 9, wherein the fastening section extends parallel to the floor sections of the tray part.

12. The motor vehicle according to claim 1, wherein steps are disposed on at least one of the floor struts, wherein one of the floor sections rests on top of an upper step of said steps and the other floor section rests on a lower step of said steps.

13. The motor vehicle according to claim 1, wherein the tray parts are rotated by 90 degrees with respect to one another.

14. A method for manufacturing a cargo space well, wherein the method comprises at least the following method steps:

providing at least two tray parts, wherein each tray part comprises a floor section and two side wall section extending vertically from opposite sides of the floor section to form a U-shaped structure, inserting the tray parts into an injection molding tool such that the floor sections are arranged so as to overlap, and the side wall sections of the tray parts circumferentially bound a cargo space of the cargo space well, and spraying or injecting a monolithic frame structure using the injection molding tool such that the sprayed or injected monolithic frame structure is connected to the tray parts in a positively locking and/or materially locking manner, and wherein the sprayed or injected monolithic frame structure comprises (i) floor struts engaging with at least one of the floor sections and (ii) side struts for supporting the side wall sections.

15. The method according to claim 14, wherein, prior to inserting the tray parts into the injection molding tool, the tray parts are connected to one another.

16. The method according to claim 14, further comprising a horizontally extending fastening section that is configured to be connected to a body of the motor vehicle, wherein the fastening section is formed integrally with the monolithic frame structure.

17. The method according to claim 16, wherein the fastening section includes openings for receiving fasteners that are fastened to the body.

18. The method according to claim 16, wherein the fastening section extends parallel to the floor sections of the tray part.

19. The method according to claim 14, wherein steps are disposed on at least one of the floor struts, and wherein one of the floor sections rests on top of an upper step of said steps and the other floor section rests on a lower step of said steps.

20. The method according to claim 14, wherein the tray parts are rotated by 90 degrees with respect to one another.

\* \* \* \* \*